(12) United States Patent
Seo et al.

(10) Patent No.: US 10,277,298 B2
(45) Date of Patent: *Apr. 30, 2019

(54) METHOD AND APPARATUS FOR TRANSMITTING CHANNEL STATE INFORMATION IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/724,830

(22) Filed: Oct. 4, 2017

(65) Prior Publication Data

US 2018/0034528 A1    Feb. 1, 2018

Related U.S. Application Data

(63) Continuation of application No. 14/350,756, filed as application No. PCT/KR2012/008310 on Oct. 12, 2012, now Pat. No. 9,787,383.

(Continued)

(51) Int. Cl.
*H04B 7/06* (2006.01)
*H04L 12/911* (2013.01)
(Continued)

(52) U.S. Cl.
CPC ......... *H04B 7/0626* (2013.01); *H04L 5/0007* (2013.01); *H04L 5/0057* (2013.01);
(Continued)

(58) Field of Classification Search
CPC .... H04B 7/0632; H04B 7/0626; H04L 1/0693
See application file for complete search history.

(56) References Cited

U.S. PATENT DOCUMENTS 9,787,383 B2 * 10/2017 Seo ................... H04B 7/0626
2010/0323720 A1 * 12/2010 Jen ................... H04B 7/2606
455/456.1
(Continued)

FOREIGN PATENT DOCUMENTS

KR    10-2011-0011524 A    2/2011
KR    10-2011-0108284 A    10/2011

OTHER PUBLICATIONS

3GPP, "TR 36.819 v11.0.0", Sep. 2011, pp. 1-68 (Year: 2011).*
(Continued)

*Primary Examiner* — Salvador E Rivas
(74) *Attorney, Agent, or Firm* — Dentons US LLP

(57) ABSTRACT

The present invention relates to a method for allowing a terminal to transmit cone or more pieces of channel state information (CSI) in a wireless communication system, and the method for transmitting the CSI comprises the steps of: determining CSI reference resources from a subframe which is to transmit the one or more pieces of CSI; and transmitting the one or more pieces of CSI measured in the CSI reference resources wherein the determination of the CSI reference resources uses measurement sets which include one or more interference measurement sets and one or more signal measurement sets, and if the CSI reference resources are included in an overlapping manner in two or more of the one or more interference measurement sets and the one or more signal measurement sets, a resource for measuring interference or a signal is separated within the CSI reference resources.

16 Claims, 11 Drawing Sheets

Related U.S. Application Data

(60) Provisional application No. 61/547,049, filed on Oct. 14, 2011.

(51) Int. Cl.
*H04L 5/00* (2006.01)
*H04L 1/06* (2006.01)
*H04B 7/0417* (2017.01)
*H04B 7/024* (2017.01)

(52) U.S. Cl.
CPC .............. *H04L 47/70* (2013.01); *H04L 47/78* (2013.01); *H04B 7/024* (2013.01); *H04B 7/0417* (2013.01); *H04L 1/0693* (2013.01)

(56) References Cited

U.S. PATENT DOCUMENTS

| | | | |
|---|---|---|---|
| 2011/0141987 A1* | 6/2011 | Nam | H04L 1/0003 370/329 |
| 2012/0076017 A1 | 3/2012 | Luo et al. | |
| 2012/0213261 A1 | 8/2012 | Sayana et al. | |
| 2012/0257524 A1 | 10/2012 | Chen et al. | |
| 2012/0281555 A1* | 11/2012 | Gao | H04L 5/0051 370/252 |

OTHER PUBLICATIONS

LGE, Consideration on interference measurement for CSI feedback, R1-113190, 3GPP RAN WG1 #66bis, Oct. 10, 2011 Sections 3.1, 3.2.

Pantech, Discussion on CSI-RS configuration for Rel-11, R1-113106, 3GPP RAN WG1 #66bis, Oct. 10, 2011 Sections 1 and 2.

Samsung, Indication and Determination of CSI-RS Configuration, R1-104597, 3GPP RAN WG1 #62, Aug. 27, 2010 Section 2.

* cited by examiner

FIG. 5
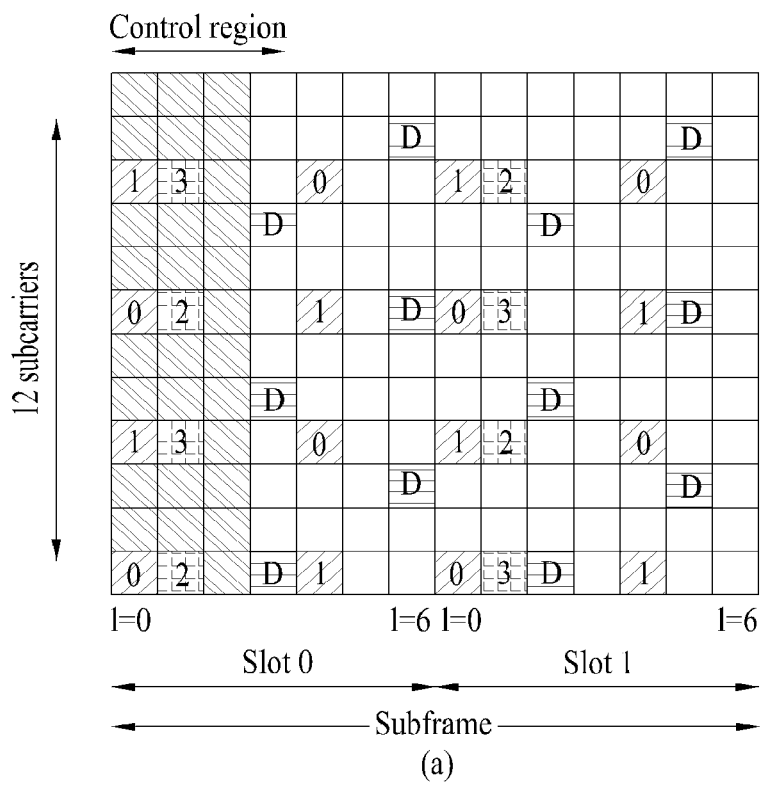
(a)
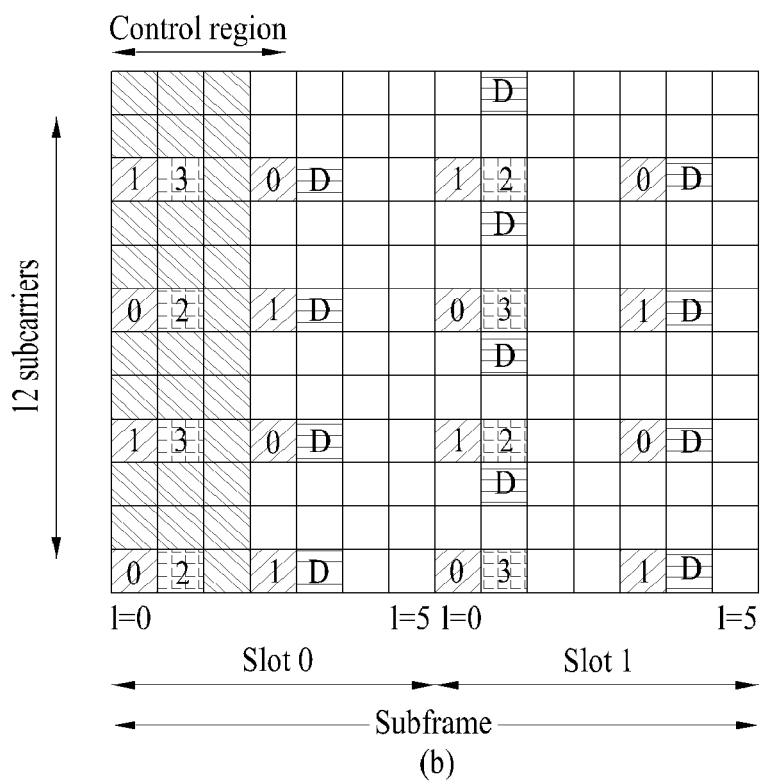
(b)

METHOD AND APPARATUS FOR TRANSMITTING CHANNEL STATE INFORMATION IN WIRELESS COMMUNICATION SYSTEM

This application is a continuation of U.S. application Ser. No. 14/350,756, filed on Apr. 9, 2014 now allowed, which is a 371 national stage entry of International Application No. PCT/KR2012/008310, filed Oct. 12, 2012, and claims the benefit of U.S. Provisional Application No. 61/547,049, filed on Oct. 14, 2011, all of which are incorporated by reference in their entirety herein.

TECHNICAL FIELD

The present invention relates to a wireless communication system, and more particularly to a method and apparatus for transmitting channel state information (CSI) in the wireless communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method and apparatus for transceiving control information, and more particularly to the relationship between an e-PDCCH and a resource region to which system information is transmitted during e-PDCCH transmission.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting one or more channel state information (CSI) by a user equipment (UE) in a wireless communication system including: determining a CSI reference resource from a subframe to be used for transmission of the one or more CSI; and transmitting the one or more CSI measured at the CSI reference resource, wherein the determination of the CSI reference resource uses a measurement set including one or more interference measurement set and one or more signal measurement set, and if the CSI reference resource is repeatedly contained in at least two of the one or more interference measurement set and the one or more signal measurement set, resources for interference or signal measurement are separated from the CSI reference resource.

In a second technical aspect of the present invention, a user equipment (UE) device for use in a wireless communication system includes: a transmission (Tx) module; and a processor, wherein the processor determines a CSI reference resource from a subframe to be used for transmission of the one or more CSI, and transmits the one or more CSI measured at the CSI reference resource, wherein the determination of the CSI reference resource uses a measurement set including one or more interference measurement set and one or more signal measurement set, and if the CSI reference resource is repeatedly contained in at least two of the one or more interference measurement set and the one or more signal measurement set, resources for interference or signal measurement are separated from the CSI reference resource.

The first and second technical aspects may include all or some parts of the following items.

The resources for interference or signal measurement may be configured by CSI reference signal configuration.

Each of the one or more interference measurement set and the one or more signal measurement set may be set of subframe used for the CSI reference resource on a time axis. Each of the one or more interference measurement set and the one or more signal measurement set may be configured per transmission point. The one or more interference measurement set and the one or more signal measurement set may be paired per transmission point. The transmission point may be contained in a transmission point aggregation for Coordinated Multi-Point (CoMP).

The method may further include: receiving information regarding the measurement set from a base station (BS).

Information regarding the measurement set may be applied to the user equipment (UE) through Radio Resource Control (RRC) signaling.

The interference measurement may be performed on the basis of zero-power CSI reference signal.

The interference measurement may be performed on the basis of non-zero power CSI reference signal.

In case of periodic reporting, the CSI reference resource may be decided to be a valid subframe from among subframes located before 'n' from a subframe to be used for transmission of the one or more CSI.

In case of aperiodic reporting, the CSI reference resource may be decided to be a valid subframe corresponding to a subframe including an uplink (UL) grant.

Advantageous Effects

As is apparent from the above description, the embodiments of the present invention provides technologies for deciding channel-state-report reference resources when a plurality of interference/signal measurement sets is present during transmission of a channel state report, and technologies related to reporting multiple pieces of channel state information.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

BEST MODE

Figure 1:
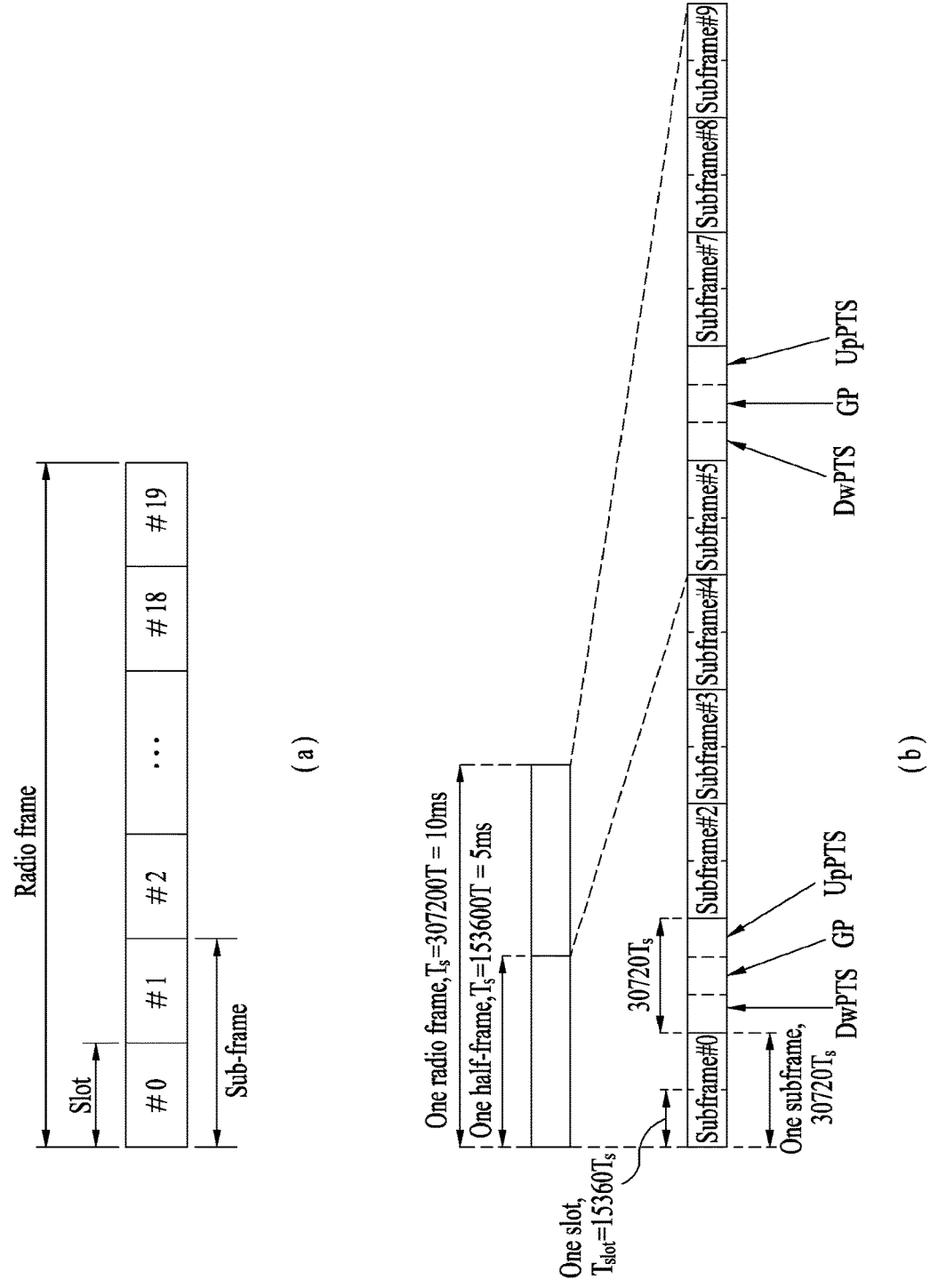
FIG. 1 exemplarily shows a downlink radio frame structure.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices.

Wherever possible, the same reference numbers will be used throughout the drawings to refer to the same or like parts.

Embodiments of the present invention may be supported by the standard documents disclosed in one or more of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1(a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1(b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
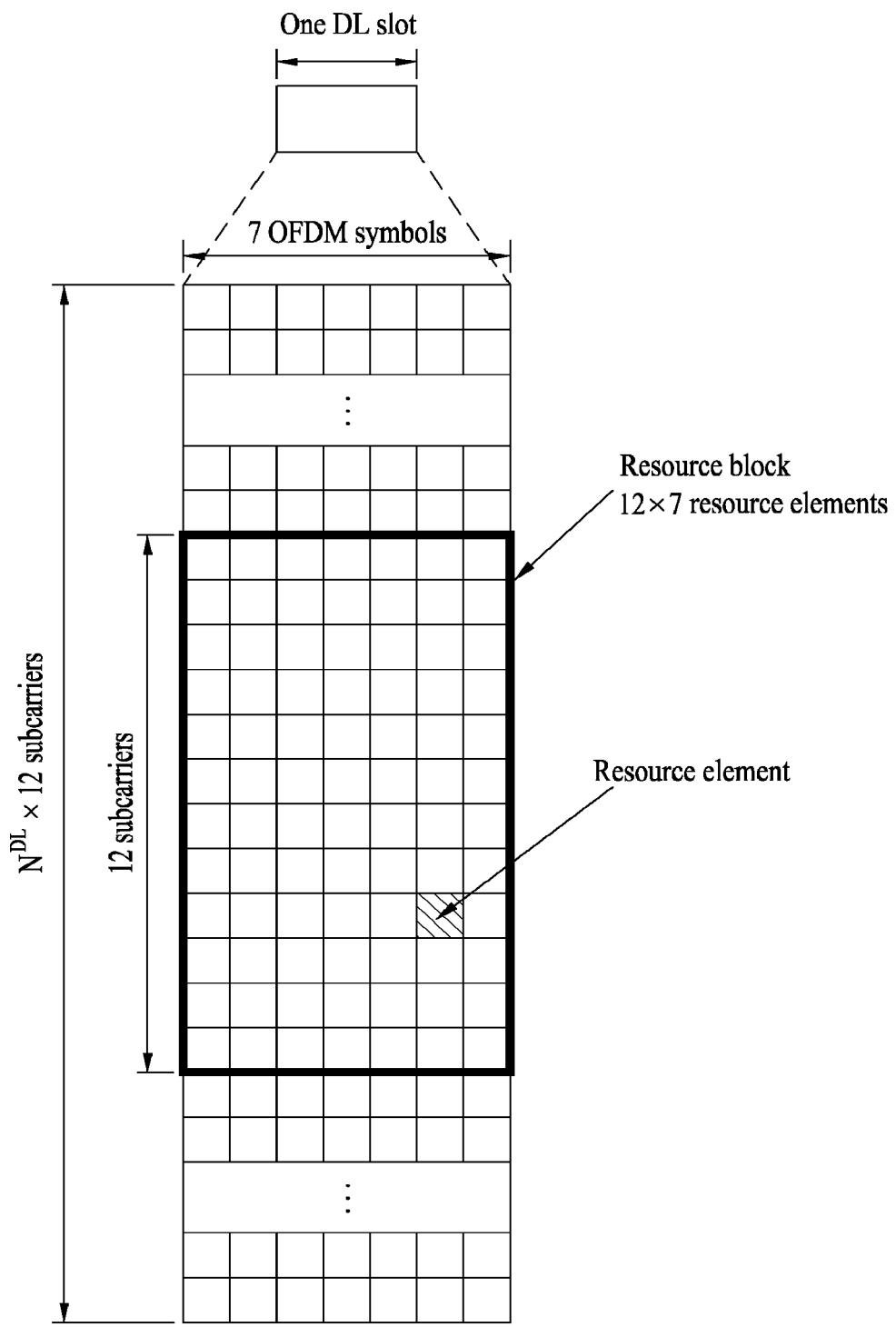
FIG. 2 exemplarily shows a resource grid of one downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
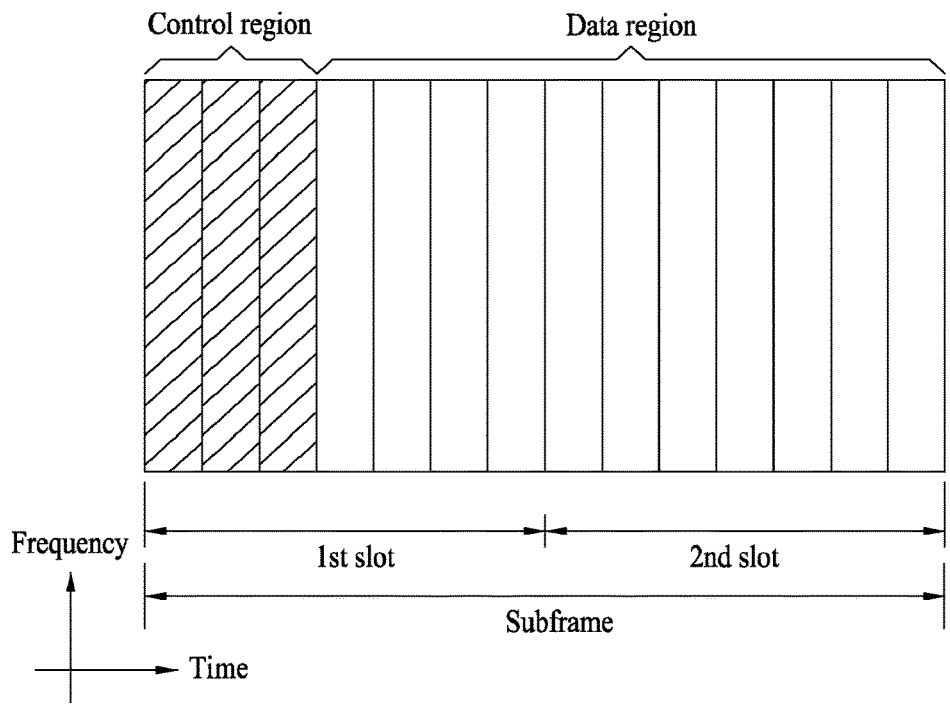
FIG. 3 exemplarily shows a downlink subframe structure.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of one or more or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
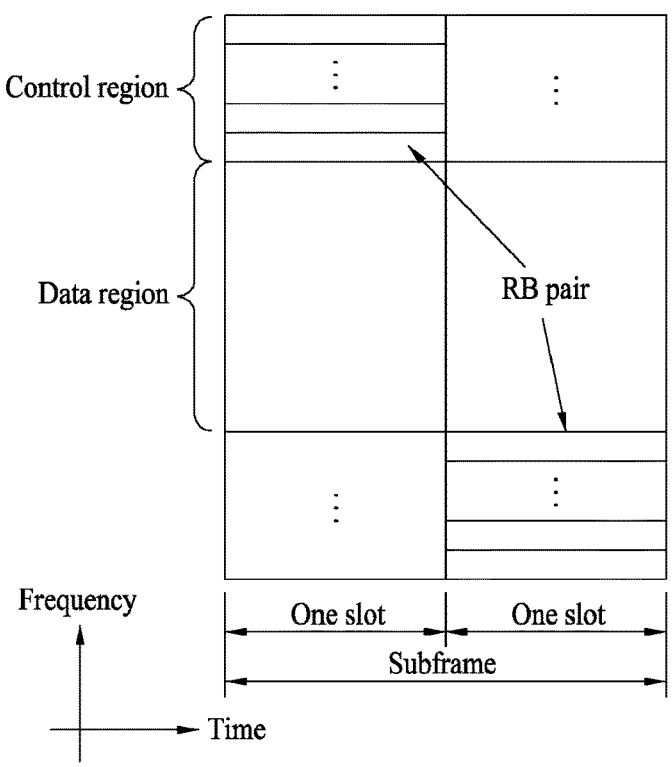
FIG. 4 exemplarily shows an uplink subframe structure.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. The signal is referred to as a pilot signal or a reference signal.

If data is transmitted and received using multiple antennas, a channel state between each transmission antenna and each reception antenna should be known in order to accurately receive a signal. Accordingly, a reference signal is present per transmission antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:

i) a cell-specific reference signal (CRS) shared by all UEs in the cell, ii) a UE-specific reference signal for a specific UE, iii) a demodulation-reference signal (DM-RS) transmitted for coherent demodulation if a PDSCH is transmitted, iv) a channel state information-reference signal (CSI-RS) for delivering channel state information (CSI) if a downlink DMRS is transmitted, v) an MBSFN reference signal transmitted for coherent demodulation of a signal transmitted in a multimedia broadcast single frequency network (MBSFN) mode, and vi) a positioning reference signal used to estimate geographical position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the base station.

For example, if the number of transmit antennas of the base station is 2, CRSs for antenna ports 0 and 1 are transmitted and, if the number of transmit antennas of the base station is 4, CRSs for antenna ports 0 to 3 are transmitted.

Figure 7:
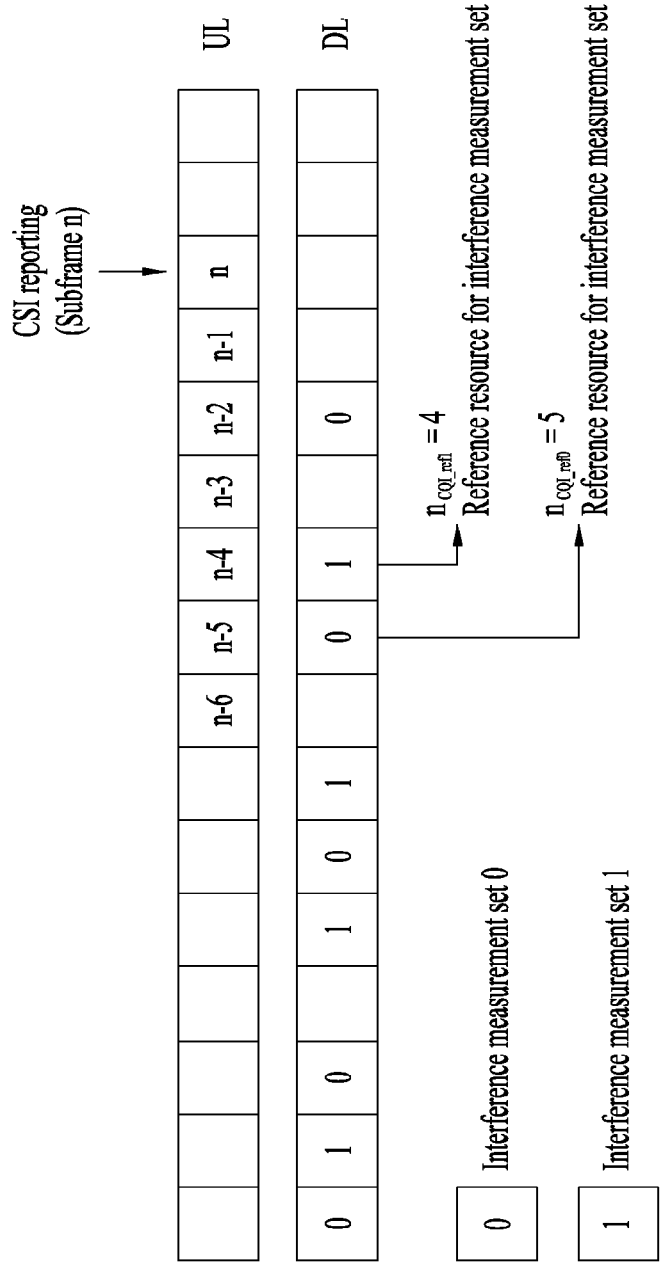
FIGS. 7 to 11 are conceptual diagrams illustrating methods for deciding channel state information (CSI) reference resources according to embodiments of the present invention.

FIG. 7 is a diagram illustrating a pattern in which CRSs and DRSs defined in a legacy 3GPP LTE system (e.g., release-8) are mapped onto resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 7(a)) and 12 OFDM symbols in case of an extended CP (FIG. 7(b)).

FIG. 7 shows locations of the reference signals on the RB pairs in a system in which the base station supports four transmit antennas. In FIG. 7, resource elements (REs) denoted by "0", "1", "2" and "3" represent the locations of the CRSs for antenna port indices 0, 1, 2 and 3. Meanwhile, the RE denoted by "D" represents the location of the DMRS.

Channel State Information-RS (CSI-RS)

CSI-RS is an RS used for channel measurement in an LTE-A system supporting up to eight antenna ports on downlink. CSI-RS differs in this aspect from CRS used for both channel measurement and data demodulation and thus, unlike CRSs, it is not necessary to transmit CSI-RSs in every subframe. CSI-RS is used in Mode 9. For data demodulation, DMRS is used. More specifically, CSI-RSs may be transmitted through 1, 2, 4 or 8 antenna ports. Antenna port 15 may be used for one antenna port, antenna ports 15 and 16 for two antenna ports, antenna ports 15 to 18 for four antenna ports, and antenna ports 15 to 22 for eight antenna ports.

CSI-RSs may be generated by the following equation 1.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, N_{RB}^{max,DL} - 1$$

Where $r_{l,n_s}(m)$ denotes the generated CSI-RSs, $c(i)$ denotes a pseudo-random sequence, $n_s$ is a slot number, $l$ is an OFDM symbol index, and $N_{RB}^{max,DL}$ denotes the maximum number of RBs in a downlink bandwidth.

The CSI-RSs generated by Equation 1 may be mapped to REs on a per-antenna port basis by the following equation 2.

$$a_{k,l}^{(p)} = w_{l''} \cdot r_{l,n_s}(m')$$ [Equation 2]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In [Equation 2], k' and l' may be determined according to CSI-RS configurations as illustrated in [Table 1].

TABLE 1

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figure 6:
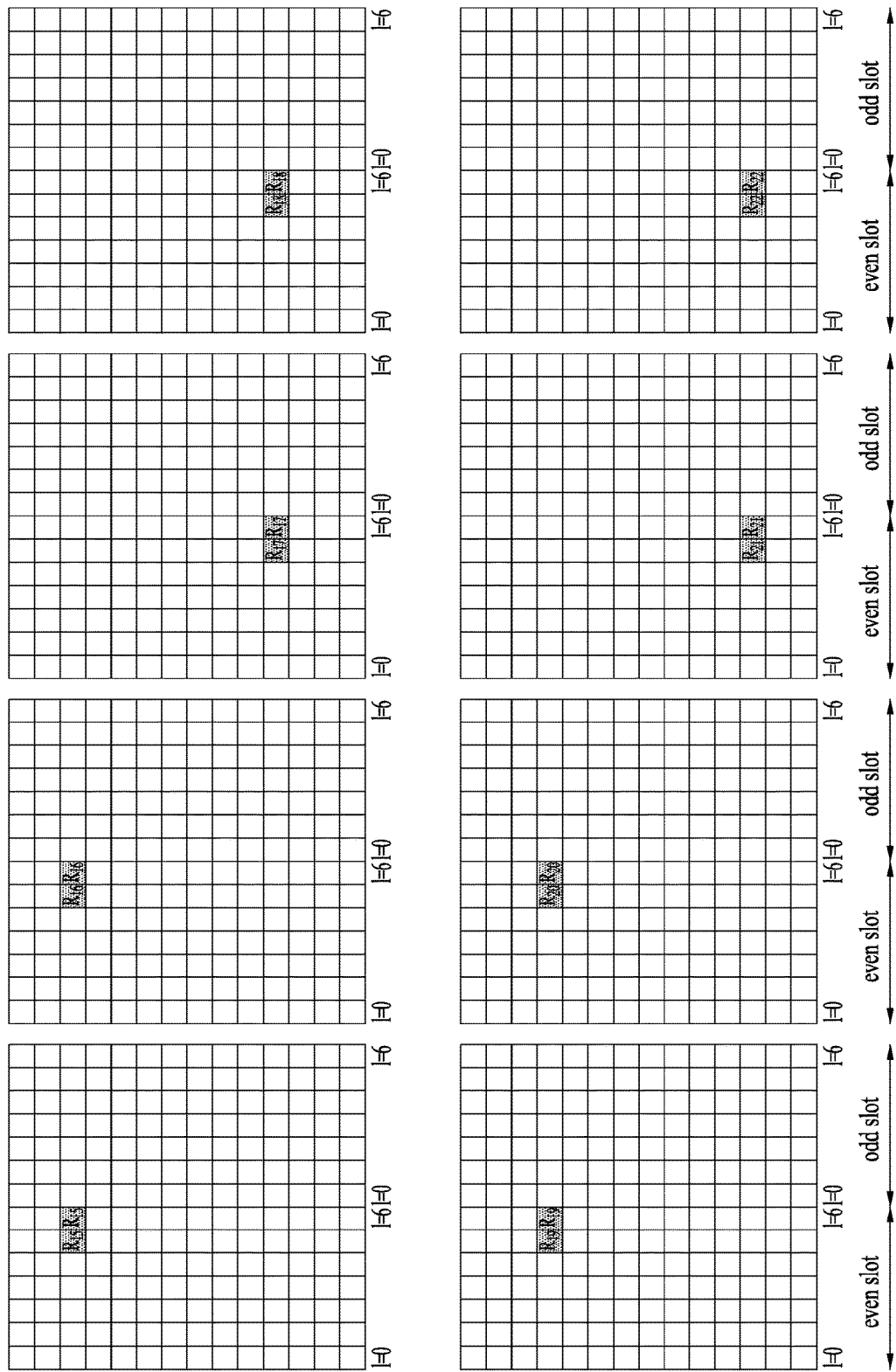
FIG. 6 illustrates an exemplary configuration for mapping CSI-RSs to REs.

CSI-RSs are mapped to REs on a per-antenna port basis according to a specific CSI-RS configuration by Equation 1 and Equation 2. For example, in the case of CSI-RS Configuration 0, CSI-RSs are mapped in the manner illustrated in FIG. 6.

As described before, CSI-RSs are transmitted in a specific subframe, not in every subframe. Specifically, CSI-RSs may be transmitted in a subframe satisfying the following equation 3, referring to a CSI-RS subframe configuration as illustrated in [Table 2] below.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

$$(10n_f + \lfloor n_s/2 \rfloor - \Delta_{CSI-RS}) \bmod T_{CSI-RS} = 0 \quad \text{[Equation 3]}$$

where $T_{CSI-RS}$ denotes the transmission period of CSI-RSs, $\Delta_{CSI-RS}$ is an offset, $n_f$ is a system frame number, and $n_s$ is a slot number.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Channel State Information (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver can perform beamforming based on CSI to obtain MIMO Tx antenna multiplexing gain. The transmitter (e.g. eNB) can allocate an uplink control channel or an uplink shared channel to the receiver (e.g. UE) such that the receiver can feed back CSI.

CSI fed back may include a rank indicator (RI), a precoding matrix index (PMI) and a channel quality indictor (CQI).

The RI indicates information about a channel rank. The channel rank represents a maximum number of layers (or streams) through which different pieces of information can be transmitted through the same time-frequency resource. The RI is determined by long term fading of a channel, and thus the RI can be fed back to an eNB at a longer period than the PMI and CQI.

The PMI is information about a precoding matrix used for transmission from a transmitter and is a value in which spatial characteristics of a channel are reflected. Precoding refers to mapping a transport layer to a transmit antenna. A layer-to-antenna mapping relation can be determined by a precoding matrix. The PMI indicates a precoding matrix index of an eNB preferred by a UE based on a metric such as signal-interference plus noise ratio (SINR). To reduce feedback overhead of precoding information, the transmitter and receiver can share a codebook including precoding matrices and only an index indicating a specific precoding matrix in the codebook can be fed back.

The CQI indicates channel quality or channel intensity. The CQI can be represented as a predetermined MCS combination. That is, a fed back CQI index indicates a corresponding modulation scheme and a code rate. The CQI represents a value in which a reception SINR that can be obtained when an eNB configures a spatial channel using the PMI is reflected.

In a system supporting an extended antenna configuration (e.g. LTE-A), additional multi-user diversity is obtained using multi-user MIMO (MU-MIMO). When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, MU-MIMO requires more accurate CSI feedback than single user MIMO (SU-MIMO).

A new CSI feedback scheme that improves CSI composed of the RI, PMI and CQI can be applied in order to measure and report more accurate CSI. For example, precoding information fed back by a receiver can be indicated by a combination of two PMIs. One (first PMI) of the two PMIs is long term and/or wideband information and may be denoted as W1. The other PMI (second PMI) is short term and/or subband information and may be denoted as W1. A final PMI can be determined by a combination (or function) of W1 and W2. For example, if the final PMI is W, W can be defined as W=W1*W2 or W=W2*W1.

CQI is information indicating channel quality or channel strength. CQI may be represented by a combination of predetermined MCSs. That is, a feedback CQI index may indicate a modulation scheme and a code rate. Generally, a reception SINR capable of being obtained when the BS constructs a spatial channel using a PMI is applied to CQI.

The current LTE/LTE-A system defines 'CSI reference resource' related to channel measurement for the above-described CSI feedback/reporting. The CSI reference resource is defined by a group of physical RBs corresponding to a frequency band for which a CQI is calculated in the frequency domain. From a time perspective, for CSI transmission/reporting in subframe n, the CSI reference resource is defined by a single downlink subframe, $n-n_{CQI\_ref}$. i) For periodic CSI reporting, $n-n_{CQI\_ref}$ is the smallest value greater than or equal to 4, which is a valid downlink subframe. ii) For aperiodic CSI reporting, $n-n_{CQI\_ref}$ is typically the reference resource in the same valid downlink subframe as a corresponding CSI request in a DCI format for uplink transmissions. iii) For aperiodic CSI reporting triggered by a Random Access Response Grant carrying a CSI request, $n-n_{CQI\_ref}$ equals 4. A downlink subframe is considered valid when it is configured as a downlink subframe for a particular UE, it is not an MBSFN subframe except for Mode 9, it contains a DwPTS with a predetermined size or larger, it does not fall within a configured measurement gap for that UE, and for periodic CSI reporting, it should be an element of a CSI subframe set when that UE is configured with CSI subframe sets. A higher layer may configure CSI subframe sets ($C_{CSI,0}$, $C_{CSI,1}$) for the UE. The current standard defines that the CSI reference resource is included in one of the two CSI subframe sets ($C_{CSI,0}$, $C_{CSI,1}$), not in both.

In the case of CSI reporting for use in the current LTE/LTE-A, only one CSI subframe set can be reported in a UL subframe. However, as various Tx schemes (MU-MIMO, CoMP, etc.) based on a plurality of links appear, it is necessary to report a plurality of CSIs on a single UL subframe. Specifically, when channel information of all or some of Tx points contained in a CoMP aggregation (or CoMP group) is requested, a user equipment (UE) has to transmit a plurality of CSIs by reflecting channel characteristics of respective Tx points. Therefore, a method for reporting one or more CSIs on a single UL subframe, a method for deciding CSI reference resources in association with the reporting method, and a method for signaling information of the corresponding CSI reporting will hereinafter be described in detail.

In the following embodiments, the terms "interference measurement set" and "signal measurement set" will hereinafter be used for convenience of description and better understanding of the present invention. The interference measurement set is a subframe set for measuring interference indicating base information needed to report CSI. The signal measurement set is similar to the above-mentioned CSI subframe set, and is used as a subframe set for measuring signals indicating base information needed for CSI report. The interference measurement set is compared with the CSI subframe set, such that a subframe commonly contained in different interference measurement sets may be present (this case can also be applied to the signal measurement set). In other words, the interference measurement set may include the CSI subframe set, and may be decided by subframe configuration among serving cells and neighbor cells. That is, the interference measurement set may be decided by the magnitude (caused by ABS configuration, beamforming, etc.) of interference between cells. Information regarding the measurement set including the interference measurement set may be RRC-signaled per set. Alternatively, information regarding various interference measurement sets may be contained in one set, and then signaled.

The UE may measure interference in all or some parts of the resource region of the interference measurement set, and this interference measurement operation may be performed on zero power CSI-RS. That is, interference can be measured using either a specific zero-power CSI-RS configuration or IMR (Interference Measurement Resource) configuration contained in the interference measurement set. In addition, signal measurement may be achieved on the basis of CRS, CSI-RS, etc. of a subframe to be used as CSI reference resources of the signal measurement set. Specifically, this signal measurement may be carried out on the basis of non-zero power CSI-RS. That is, signals can be measured using specific non-zero power CSI-RS configuration contained in the signal measurement set.

In addition, there may be a plurality of interference measurement sets/signal measurement sets, and the interference measurement sets/signal measurement sets may be configured per Tx point under the CoMP environment. The interference measurement sets/the signal measurement sets may be paired per Tx point. In other words, one interference measurement set and one signal measurement set may be allocated to one Tx point.

Embodiment 1

A first embodiment relates to a method for deciding CSI reference resources using an interference measurement set. For example, it is assumed that two interference measurement sets are used. Two interference measurement sets assume the absence of overlapping subframes.

FIG. 7 is a conceptual diagram illustrating the first embodiment (Embodiment 1). Referring to FIG. 7, each rectangular block denotes a subframe, "0" denotes the interference measurement set #0, and "1" denotes the interference measurement set #1. It is assumed that Subframe #n is a subframe used for transmitting CSI to a base station (BS).

In Embodiment 1, a valid subframe from among subframes located before a predetermined offset (e.g., 4 TTI (Transmission Time Interval) subframes) on the basis of the subframe #n to be used for CSI report/transmission may be determined to be a CSI reference resource per interference measurement set. For example, referring to FIG. 7, when CSI is reported for the BS at subframe #n, the CSI reference resource for interference measurement set #0 may be determined to be a downlink subframe corresponding to a subframe (n−4) located 4 subframes before the subframe #n. The CSI reference resource for the interference measurement set #1 may be determined to be a downlink subframe corresponding to a subframe (n−5). In the case of the subframe (n−4), $n_{CQI\_ref}$ is set to 4. In the case of the subframe (n−5), $n_{CQI\_ref}$ is set to 5. It is premised that downlink subframes (n−4, n−5) are valid. As described above if the CSI reference resource for each interference measurement set is decided, the UE may report CSI to be used for the CSI reference resource for each interference measurement set at subframe #n. However, although the CSI reference resource for each interference measurement set is decided, CSIs of CSI reference resources of all interference measurement sets are not always reported at the same time. Information as to how many CSIs will be reported or information as to which interference measurement set will be used for CSI reporting can be indicated through additional signaling. Specifically, the above information may be applied to the UE through RRC signaling or the like.

Meanwhile, even in case of aperiodic CSI reporting, CSI reference resources can be determined in a similar way to the above description. A subframe in which a request of the aperiodic CSI report contained in the UL DCI format is signaled may be decided by the CSI reference resource. If there is a need to report a plurality of CSIs, i.e., if several interference measurement sets are present, a subframe located closest to another subframe in which the CSI request is received per interference measurement set may be decided by the CSI reference resource of each interference measurement set. In this case, the number of interference measurement sets to be reported may be indicated through higher layer signaling or the like.

Embodiment 2

Embodiment 2 relates to the case in which multiple interference measurement sets overlap. That is, Embodiment 2 relates to an exemplary case in which a certain subframe is repeatedly contained in at least two interference measurement sets.

In case of aperiodic CSI report, a valid subframe from among front subframes spaced apart from a specific subframe to be used for CSI report by at least 4 subframes is used as the CSI reference resource, and CSI may be reported for all the interference measurement sets each including the corresponding subframe. In this case, 4 subframes may be changed to other arbitrary value in consideration of a UE processing time or the like.

Figure 8:
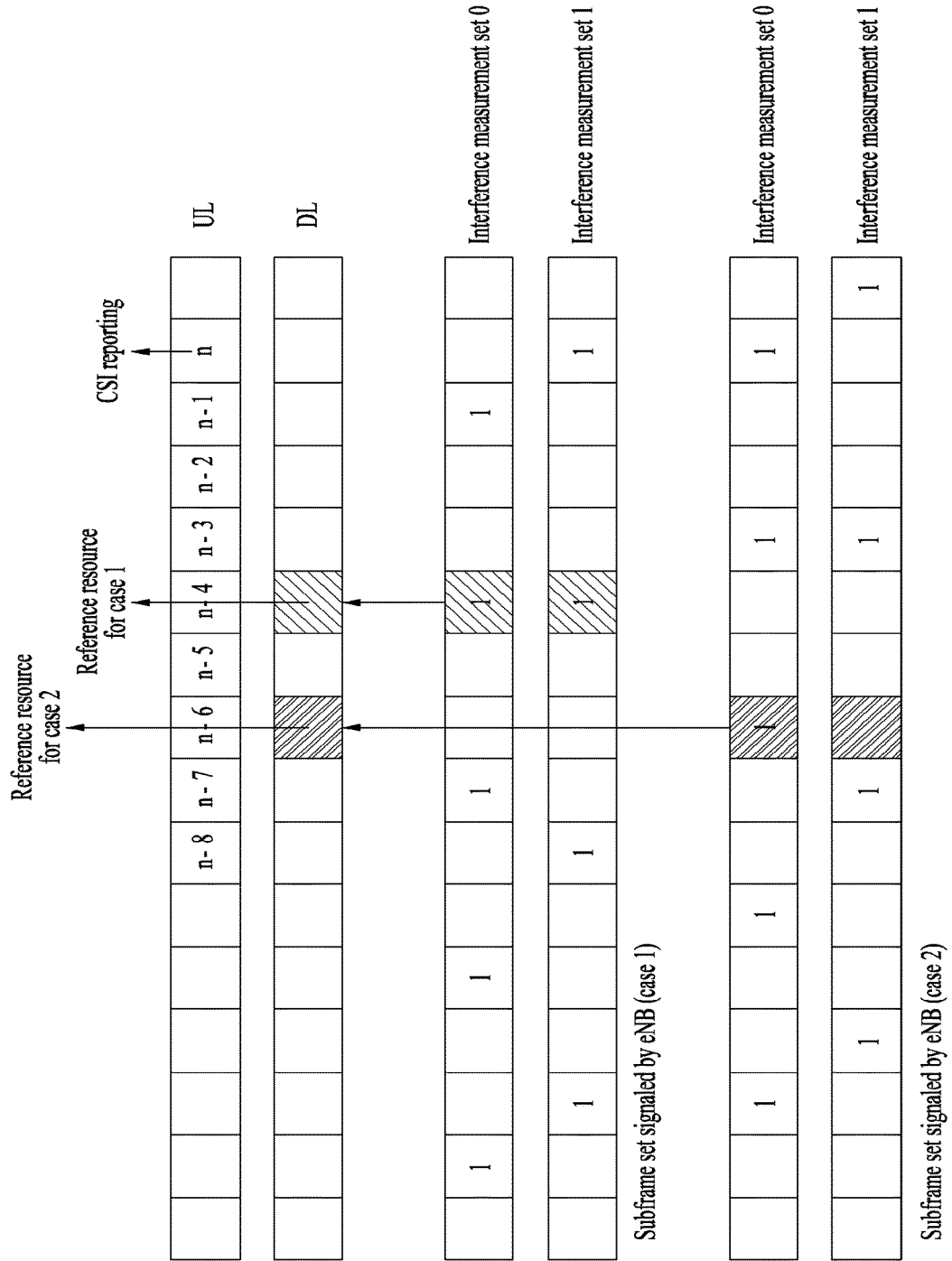

Referring to FIG. 8, assuming that periodic CSI report is achieved at Subframe #n, CSI reference resources of the interference measurement sets (0, 1) of the first case (Case 1) correspond to subframes (n−4). This means that one subframe can be configured as reference resources for two different CSI reports. For example, CQI of one subframe can report different CQI values according to the interference measurement set. Further, two CSIs should be reported in one subframe, and resources to be measured for each interference measurement set may be separated from Subframes (n∼4) corresponding to CSI reference resources. For example, resources for interference measurement at the interference measurement set #0 may be the first time-frequency resources at subframes (n∼4), and interference measurement resources for the first interference set 1 may be the second time-frequency resources different from the first time-frequency resources.

Continuously, CSI reference resources of the second case (Case 2) may be subframes (n∼4) as shown in FIG. 8, and subframes (n∼4) are contained only in the interference measurement set #0, such that the UE can report only CSI of the interference measurement set #0. In accordance with the above-mentioned second embodiment, configuration of the interference measurement set or the CSI report time is adjusted, and the adjusted result can be received without additional signaling at a specific time at which CSI for the interference measurement set desired by the BS is required. However, if selective CSI report is needed, the interference measurement set desired by the BS or the number of interference measurement sets may be transferred through RRC signaling or the like.

In case of aperiodic CSI report, a downlink subframe corresponding to the subframe in which UL DCI format is signaled may be determined to be CSI reference resources. If CSI reference resources are repeatedly contained in two or more interference measurement sets, CSI for selective or all interference measurement sets may be reported. For example, in the first case of FIG. 8, if UL DCI format is transmitted to downlink subframes (n∼4), the UE can report CSI of the interference measurement set #0 and CSI of the interference measurement set 1. If UL DCI format is transmitted at the subframes (n∼4), the UE can report CSI based on the interference measurement set #0.

Embodiment 3

Embodiment 3 relates to a method for deciding CSI reference resources on the condition that one or more interference measurement sets are present and plural CSI configurations for signal measurement are summed. Signal measurement may be carried out using CRS, and this signal measurement can be carried out using CSI-RS (e.g., non-zero power CSI-RS) transmitted at intervals of a predetermined time during transmission (Tx) mode #9 of LTE Release 10. If signal measurement of multiple cells is needed for purposes of CoMP, eICIC, and MU-MIMO, various CSI configurations may be present, and each CSI configuration may include repeated subframes. For example, CSI configuration may be classified according to different antenna ports at the same Tx point, and RSs of different Tx points may be defined as different CSI-RS configurations.

If the interference measurement set is not present separately, the CSI reference resource can be decided on the basis of the CSI configuration. That is, considering either the CSI report time or the UE processing time started from the CSI report time, a temporally-close subframe may be decided to be CSI reference resources, and this subframe decision may be performed per CSI configuration. Alternatively, specific information as to which CSI will be reported at the corresponding report time will be indicated through RRC signaling or the like.

Figure 9:
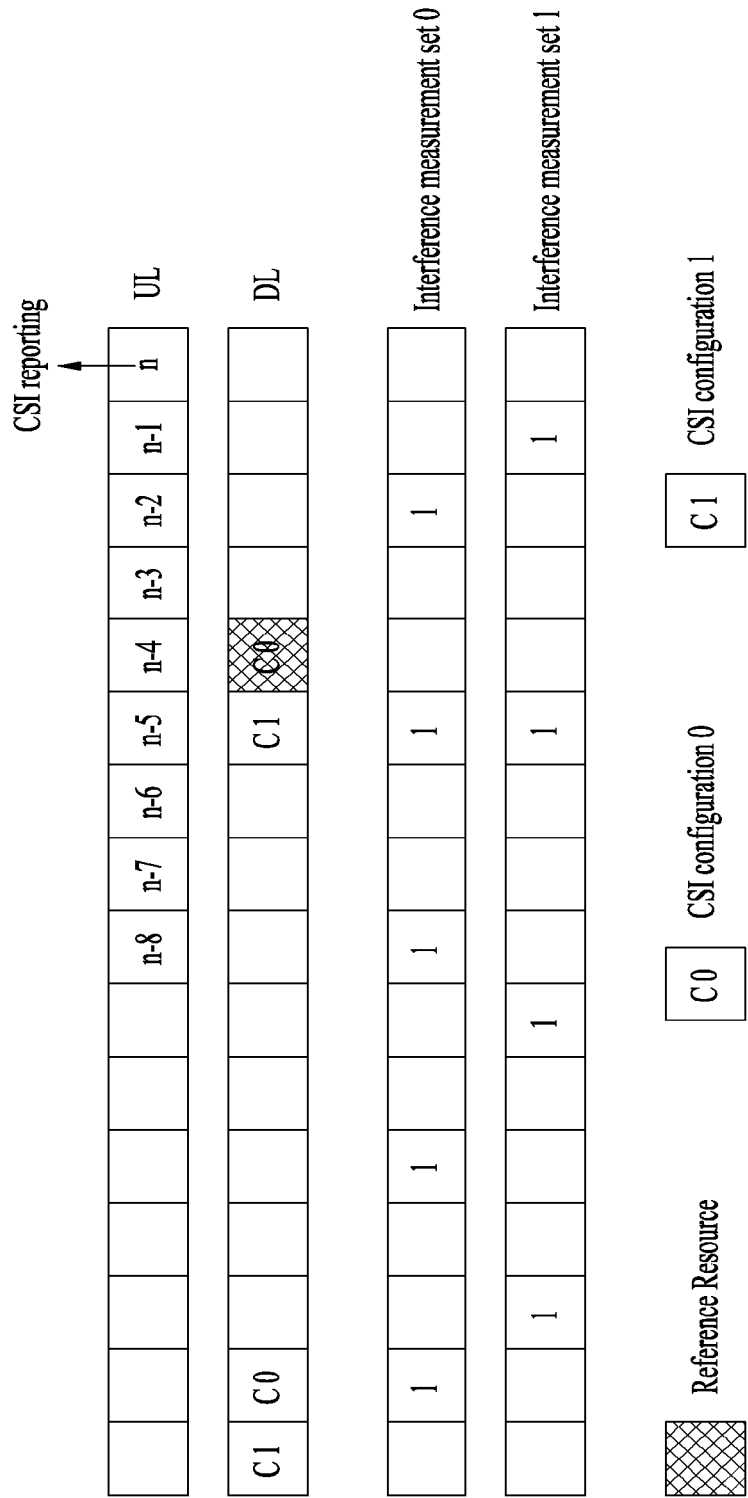

FIG. 9 is a conceptual diagram illustrating Embodiment 3. Assuming that a plurality of interference measurement sets (interference measurement sets #0 and #1) and CSI configurations (0, 1) are present as shown in FIG. 9, CSI configuration may be classified according to different CSI antenna ports of the same cell, and may also be classified into CSIs or CSI-RSs of different cells. It may be appreciated that C0 and C1 of FIG. 9 may be different CI-RS configurations contained in one subframe. In addition, the CSI reference resource may correspond to subframes (n∼4) as valid subframes from among subframes spaced apart from the report time by 4 subframes or greater.

In FIG. 9, Embodiment 3 relates to a method for reporting a plurality of CSIs without additional signaling, and provides a method for reporting CSI configured in the CSI reference resource. That is, as shown in FIG. 9, CSI of CSI configuration #0 (C0) may be reported at subframe #n. Differently from FIG. 9, if different CSI configurations are present in the same subframe, CSI of each CSI configuration can be reported. In this case, interference measurement may be performed in all interference measurement sets (CSI of C0 and interference measurement set 0, and CSI of C0 and interference measurement set 1). If the interference measurement sets tied with C0 is present, not only interference measured at the corresponding interference measurement set but also CSI based on signals measured at C0 can be reported.

In another method, in association with all CSI configurations, signals measured at the subframe located closest to the CSI reference resources can be reported for CSI report. That is, as can be seen from FIG. 9, signal measurement based not only C0 of the subframe (n−4) acting as the CSI reference resource but also C1 of the subframe (n−5) may be used for CSI report. In this case, interference measurement may be performed based on all interference measurement sets or interference measurement sets tied with each CSI configuration.

In case of aperiodic CSI reporting, the subframe in which UL DCI format is transmitted is transmitted may be CSI reference resources. If a plurality of CSI configurations is present in the corresponding DL subframe, the corresponding CSI can be reported.

In the above-mentioned description, in order to facilitate selection of the CSI reference resource, CSI configuration to be reported, and selection of the interference measurement set, additional signaling may be used. The following contents may be applied to both periodic reporting and aperiodic reporting, or may be signaled independently or collectively.
i) If a plurality of CSI configurations is present in one subframe, CSI configuration to be reported can be signaled.
ii) If different CSI configurations are present in different subframes, CSI configuration to be reported can be signaled.
iii) If a plurality of interference measurement sets is present, specific information as to which interference measurement set will be used for CSI reporting can be signaled.

Embodiment 4

Embodiment 4 relates to an exemplary case in which one or more interference measurement sets and one or more signal measurement sets are present and the CSI reference resources are repeatedly contained in at least two interference measurement sets and at least two signal measurement sets. As described above, the interference measurement set may include duplicate subframes, and the signal measurement set may also include duplicate subframes. Embodiment 4 relates to a method for deciding the CSI reference resource to be a valid subframe located 4 subframes before a specific subframe to be used for CSI reporting under the condition that the above interference measurement sets/signal measurement sets are present, and also provides an exemplary case in which the decided CSI reference resources correspond to a plurality of signal measurement sets and a plurality of reference resource sets.

Figure 10:
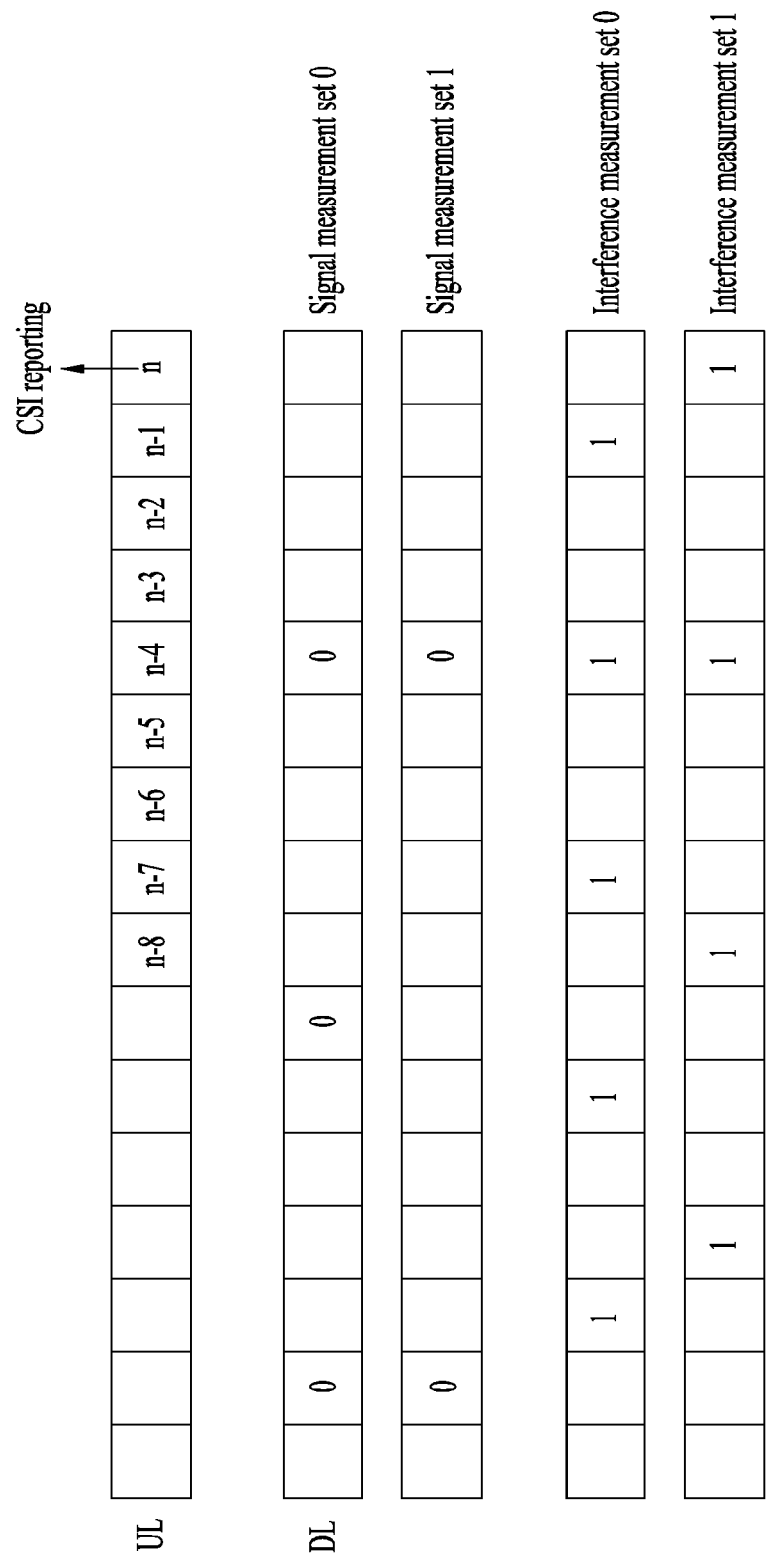

Referring to FIG. 10, the signal measurement sets (#0, #1) and the interference measurement sets (#0, #1) are present. In this case, #0 may indicate a subframe corresponding to the signal measurement set, and #1 may indicate a subframe corresponding to the interference measurement set. In addition, the signal measurement set and the interference measurement set may be configured per Tx point under the CoMP environment, and one signal measurement set and one interference measurement set may be paired with any one of Tx points. For example, the signal measurement set #0 and the interference measurement set #0 may be configured in the first Tx point, and the signal measurement set #1 and the interference measurement set #1 may be configured in the second Tx point.

Continuously, since the CSI reference resource may correspond to the signal measurement sets (0, 1) and the interference measurement sets (0, 1), the UE may feed back all CSIs (measured signal or interference) to the BS at the subframe #n. Of course, as mentioned above, the measurement set indicated by RRC signaling and the CSI corresponding to the number of measurement sets may be selectively fed back.

Figure 11:
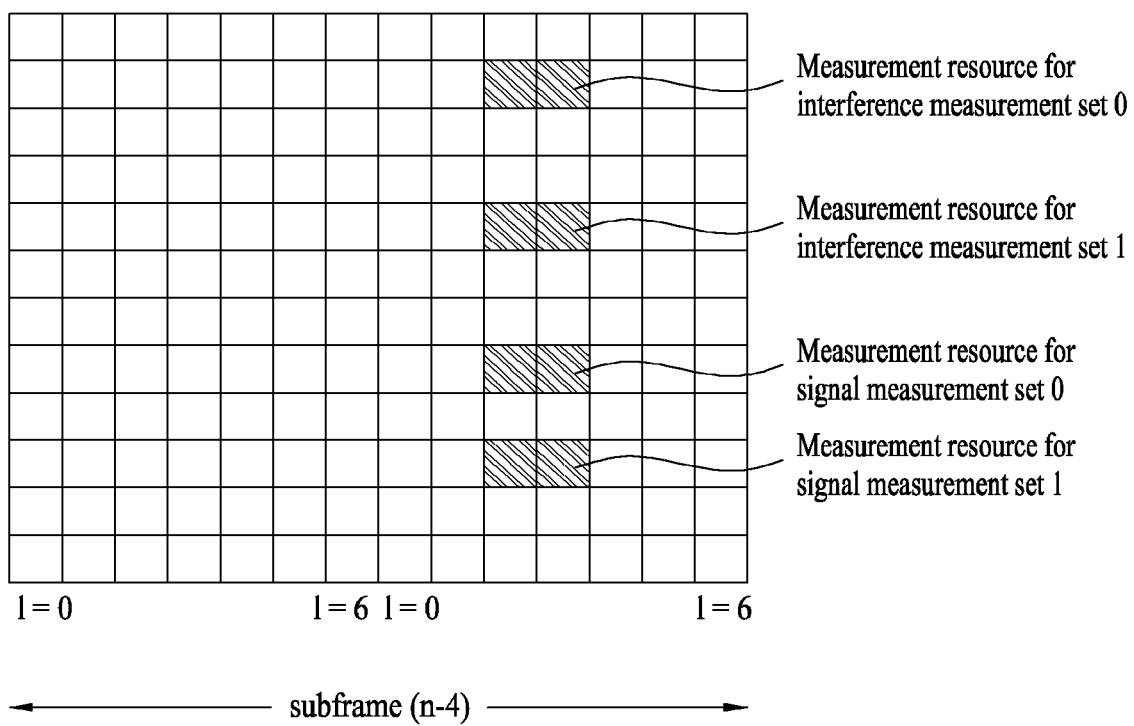

In this case, all measurement sets are overlapped with each other at the subframes (n~4) corresponding to the CSI reference resource, and resources to be used for interference or signal measurement may be separated from the time and/or frequency domain(s) within the CSI reference resource. For example, as shown in FIG. 11, the measurement resources may be at least two different REs for each interference measurement set and the signal measurement set. In this case, the measurement resource may be CSI-RS. In this case, the measurement resource may be indicated by CSI reference signal configuration. Preferably, the measurement RE for the interference measurement set may be zero-power CSI-RS or IMR, and the other measurement RE for signal measurement may be non-zero power CSI-RS. In FIG. 11, the UE measures signals or interference of the corresponding measurement resources in the CSI reference resources, and reports the measurement result to the BS (or eNB). If the corresponding measurement set is configured per Tx point of CoMP, the transmission (Tx) points having received the measurement set may be used to decide the Rx scheme such as beamforming on the basis of the reported signals or interference.

Figure 12:
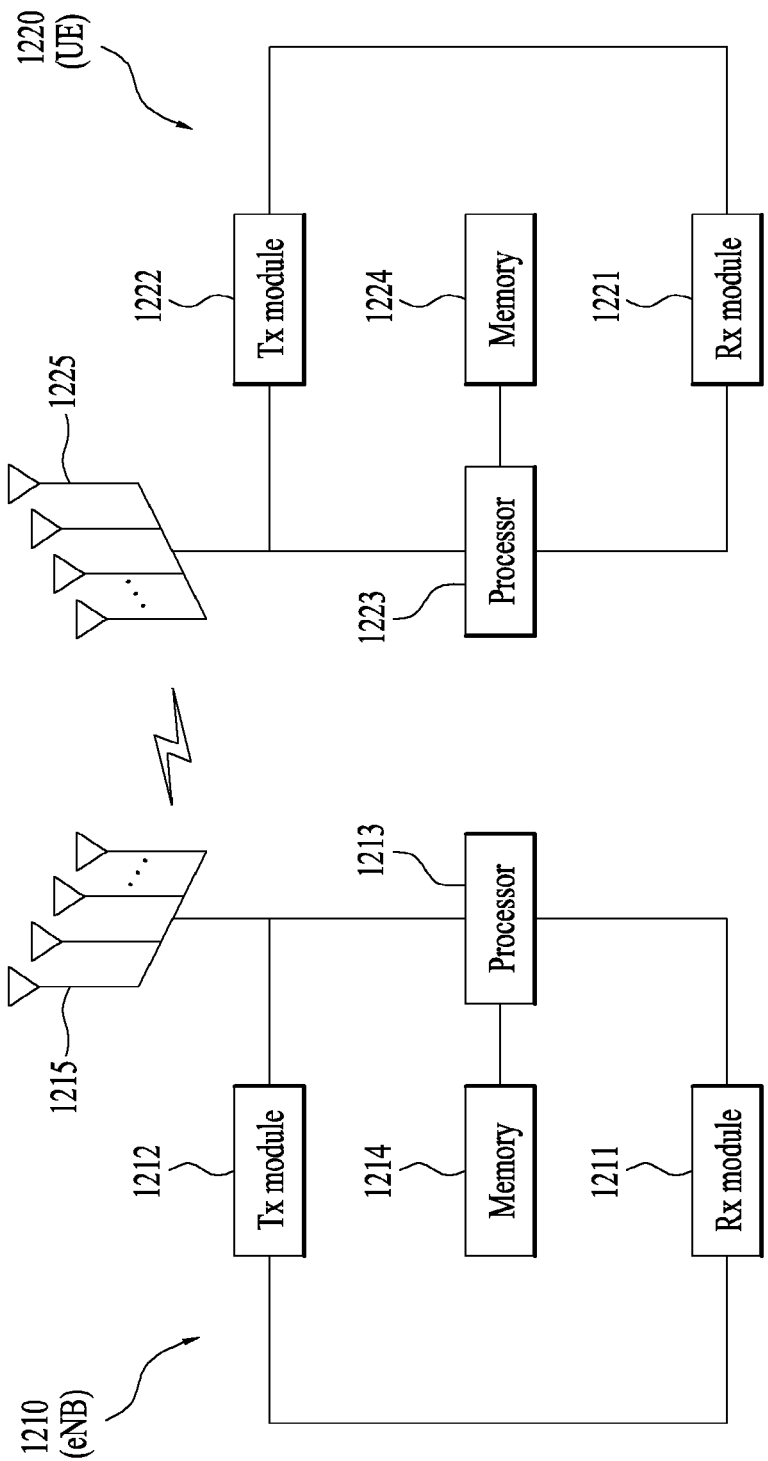
FIG. 12 is a block diagram illustrating a transceiver apparatus applicable to embodiments of the present invention.

FIG. 12 is a block diagram illustrating a transmission point apparatus and a UE device according to embodiments of the present invention.

Referring to FIG. 12, the transmission point apparatus 1210 according to the present invention may include a reception (Rx) module 1211, a transmission (Tx) module 1212, a processor 1213, a memory 1214, and a plurality of antennas 1215. The plurality of antennas 1215 indicates a transmission point apparatus for supporting MIMO transmission and reception. The reception (Rx) module 1211 may receive a variety of signals, data and information on an uplink starting from the UE. The Tx module 1212 may transmit a variety of signals, data and information on a downlink for the UE. The processor 1213 may provide overall control to the transmission point apparatus 1210.

The processor 1213 of the transmission point apparatus 1210 according to one embodiment of the present invention can process various operations needed for the above-mentioned measurement report, handover, random access, etc.

The processor 1213 of the transmission point apparatus 1210 processes information received at the transmission point apparatus 1210 and transmission information to be transmitted externally. The memory 1214 may store the processed information for a predetermined time. The memory 1214 may be replaced with a component such as a buffer (not shown).

Referring to FIG. 12, the UE device 1220 may include an Rx module 1221, a Tx module 1222, a processor 1223, a memory 1224, and a plurality of antennas 1225. The plurality of antennas 1225 indicates a UE apparatus supporting MIMO transmission and reception. The Rx module 1221 may receive downlink signals, data and information from the BS (eNB). The Tx module 1222 may transmit uplink signals, data and information to the BS (eNB). The processor 1223 may provide overall control to the UE device 1220.

The processor 1223 of the UE device 1220 according to one embodiment of the present invention can process various operations needed for the above-mentioned measurement report, handover, random access, etc.

The processor 1223 of the UE device 1220 processes information received at the UE apparatus 1220 and transmission information to be transmitted externally. The memory 1224 may store the processed information for a predetermined time. The memory 1224 may be replaced with a component such as a buffer (not shown).

The specific configurations of the transmission point apparatus and the UE device may be implemented such that the various embodiments of the present invention are performed independently or two or more embodiments of the present invention are performed simultaneously. Redundant matters will not be described herein for clarity.

The description of the transmission point apparatus 1210 shown in FIG. 12 may be applied to a relay node (RN) acting as a DL transmission entity or UL reception entity without departing from the scope or spirit of the present invention. In addition, the description of the UE device 1220 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for reporting channel state information (CSI) for coordinated multi-point (CoMP) operation by a user equipment (UE) in a wireless communication system, the method comprising:
    receiving, by the UE and from a base station (BS), interference measurement configurations and signal measurement configurations;
    obtaining, by the UE, CSI for a CSI reference resource of a downlink subframe based on at least one of the interference measurement configurations and at least one of the signal measurement configurations, and
    reporting, by the UE and to the BS, in an uplink subframe, the CSI obtained for the CSI reference resource,
    wherein each of the interference measurement configurations includes information on a first subframe for an interference measurement and each of the signal measurement configurations includes information on a second subframe for a CSI-reference signal (CSI-RS) measurement,
    wherein the UE determines an index of the downlink subframe including the CSI reference resource based on an index of the uplink subframe for reporting the CSI, and
    wherein the at least one interference measurement configuration and the at least one signal measurement configuration used for reporting the CSI are selected, among the interference measurement configurations and the signal measurement configurations, based on signaling from the BS.

2. The method according to claim 1, wherein the information on the first subframe includes a periodicity of the first subframe, and the information on the second subframe includes a periodicity of the second subframe.

3. The method according to claim 1, wherein the interference measurement configurations and the signal measurement configurations are received through radio resource control (RRC) signaling.

4. The method according to claim 3, wherein each of the signal measurement configurations is respectively tied to each of the interference measurement configurations.

5. The method according to claim 4, wherein the BS is one of a plurality of transmission points for the CoMP operation.

6. The method according to claim 4, wherein each of the signal measurement configurations respectively corresponds to each of the plurality of transmission points.

7. The method according to claim 1, wherein the CSI corresponds to an aperiodic CSI report and the downlink subframe including the CSI reference resource is a valid subframe for a subframe including an uplink (UL) grant.

8. The method according to claim 1, wherein obtaining the CSI for the CSI reference resource comprises:
    performing, by the UE, interference measurement based on the information on the first subframe;
    performing, by the UE, the CSI-RS measurement based on the information on the second subframe; and
    obtaining, by the UE, the CSI on the CSI reference resource, of the downlink subframe, based on the interference measurement and the CSI-RS measurement.

9. A user equipment (UE) for reporting channel state information (CSI) for coordinated multi-point (CoMP) operation in a wireless communication system, the UE comprising:
    a receiver;
    a transmitter; and
    a processor, operatively coupled to the receiver and the transmitter, wherein the processor is configured to:
    control the receiver to receive, from a base station (BS), interference measurement configurations and signal measurement configurations,
    obtain CSI for a CSI reference resource of a downlink subframe based on at least one of the interference measurement configurations and at least one of the signal measurement configurations, and
    control the transmitter to transmit, to the BS in an uplink subframe, the CSI obtained for the CSI reference resource,
    wherein each of the interference measurement configurations includes information on a first subframe for an interference measurement and each of the signal measurement configurations includes information on a second subframe for a CSI-reference signal (CSI-RS) measurement,
    wherein the processor determines an index of the downlink subframe including the CSI reference resource based on an index of the uplink subframe for reporting the CSI, and
    wherein the at least one interference measurement configuration and the at least one signal measurement configuration used for reporting the CSI are selected, among the interference measurement configurations and the signal measurement configurations, based on signaling from the BS.

10. The UE according to claim 9, wherein the information on the first subframe includes a periodicity of the first subframe, and the information on the second subframe includes a periodicity of the second subframe.

11. The UE according to claim 9, wherein the interference measurement configurations and the signal measurement configurations are received through radio resource control (RRC) signaling.

12. The UE according to claim 11, wherein each of the signal measurement configurations is respectively tied to each of the interference measurement configurations.

13. The UE according to claim 9, wherein the BS is one of a plurality of transmission points for the CoMP operation.

14. The UE according to claim 13, wherein each of the signal measurement configurations respectively corresponds to each of the plurality of transmission points.

15. The UE according to claim 9, wherein the CSI corresponds to an aperiodic CSI report and the downlink subframe including the CSI reference resource is a valid subframe for a subframe including an uplink (UL) grant.

16. The UE according to claim 9, wherein the processor is further configured to:
   perform interference measurement based on the information on the first subframe,
   perform the CSI-RS measurement based on the information on the second subframe, and
   obtain the CSI on the CSI reference resource, of the downlink subframe, based on the interference measurement and the CSI-RS measurement.

* * * * *